United States Patent [19]

Orlowski

[11] Patent Number: 5,137,049

[45] Date of Patent: Aug. 11, 1992

[54] PRESSURE RELIEF VALVE

[75] Inventor: David C. Orlowski, Milan, Ill.

[73] Assignee: Inpro Companies, Inc., Rock Island, Ill.

[21] Appl. No.: 742,316

[22] Filed: Aug. 8, 1991

[51] Int. Cl.⁵ ............................................. F16K 15/04
[52] U.S. Cl. .................................................. 137/533.11
[58] Field of Search .................. 137/533.11, 533; 251/144

[56] References Cited

U.S. PATENT DOCUMENTS

| | | | |
|---|---|---|---|
| 203,590 | 5/1878 | Colborne | 137/533.11 |
| 975,243 | 11/1910 | Hitchcock | 137/533.11 |
| 2,941,542 | 6/1960 | Jacobson | 137/533.11 |
| 3,520,330 | 7/1970 | Szwarzulski | 137/533.11 |
| 3,525,358 | 8/1970 | Ludwig | 137/533.11 |
| 3,770,001 | 11/1973 | Davis | 137/533.11 |
| 4,007,710 | 2/1977 | Johnson | 137/533.11 |

Primary Examiner—A. Michael Chambers
Attorney, Agent, or Firm—Rockey & Rifkin

[57] ABSTRACT

This invention is a novel pressure relief valve wherein the operative pressure generated must overcome the gravitational force of the ball seated in the resilient member.

5 Claims, 1 Drawing Sheet

PRESSURE RELIEF VALVE

BACKGROUND OF THE INVENTION

This invention relates to a novel pressure relief valve construction and specifically for a pressure relief valve for use in relieving gas pressure build-up in rotating equipment such as pumps, gear boxes, spindles, etc. In the prior art, most pressure relief valves have used spring pressure or fluid pressure to control the operation of the relief valve. This is to ensure that the relief valve will operate to relieve the pressure at a predetermined pressure and to prevent damage to the rotating equipment.

In addition, in the prior art, check valves which prevent flow in one direction and allow flow in the opposite direction have been in existence for many years. There are many types of check valves including pivoting flappers which have poor low pressure drop characteristics. There have also been check valves employing ball-type closure members where the ball is always in the path of the flow. Such ball check members are not useful without major modifications to insure the maximum flow in both directions. In almost all of the prior art, ball-type check valves utilize a predetermined spring pressure of substantial value on the closing side to insure closure.

SUMMARY OF THE INVENTION

In the present invention, an improved pressure relief valve of the ball type is provided. The improved valve is operable at extremely low pressures, in one embodiment a pressure of 0.009 psi is sufficient to operate the valve, i.e., relieve the pressure build-up. The valve has a tubular body with longitudinal bore in the tubular body. In addition, there is provided a ball in the bore and a seating member utilizing resilient material for the ball in the bore. A channel for pressure relief is slanted to prevent contaminants reaching the rotating machinery while providing an outlet for the gas under pressure. The pressure at which relief is desired may be varied by varying the material and/or the weight of the ball to actuate the valve at different values of extremely low pressure. Gravitational forces determine the seating of the ball on the seating material. Proper seating prevents flow of the pressurized gases until the pressure reaches a value sufficient to lift the ball from its seat.

DETAILED DESCRIPTION OF A PREFERRED EMBODIMENT OF THE INVENTION

Figure 1:
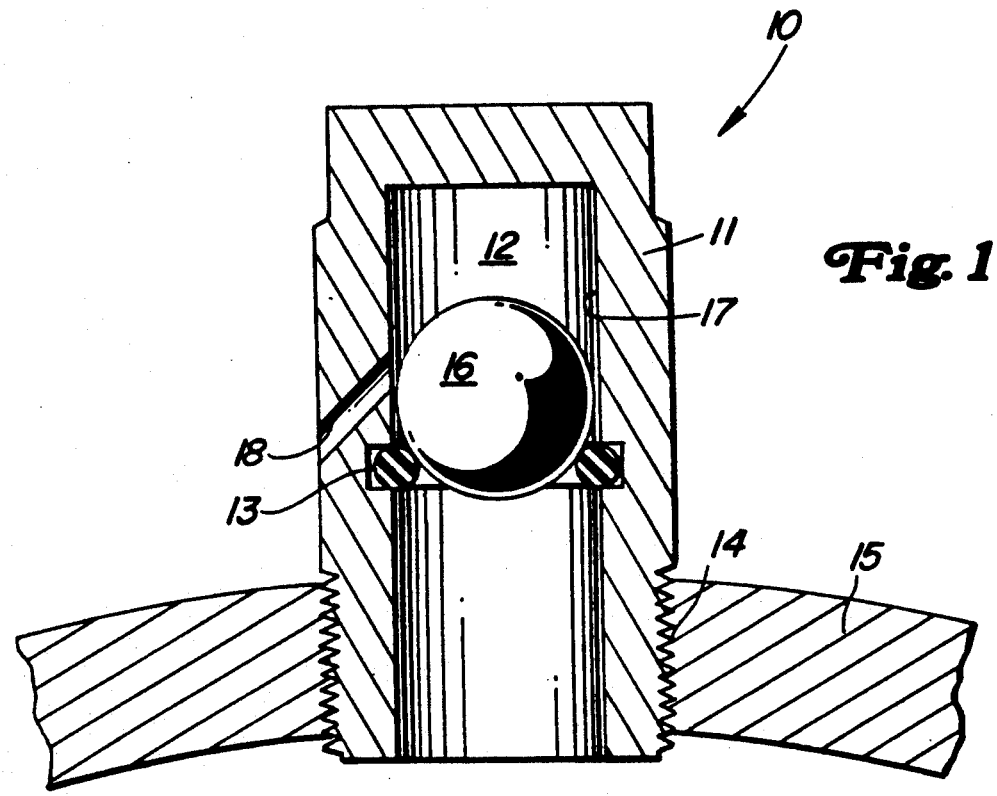
FIG. 1 is a sectional view of the pressure relief valve according to this invention with the valve closed.

Referring to FIG. 1, there is shown a check valve 10 having a tubular body 11 with a longitudinal flow bore 12 there through. The bore is divided into two sections by the seating member 13 which is formed of resilient material. The tubular body 11 is threaded at 14 for connection to the housing 15 of the pump or other device from which pressure is to be relieved. For proper performance, the valve must be on the upper surface of the rotating machinery and vertically orientated. The bore 10a in the tubular body is closed at its upper end and open below the seating means at its lower end.

A ball 16 is positioned in the bore toward the closed end of the bore above the sealing means 13. The density of the ball and the size of the ball may be varied as necessary to match the pressure generated by gas build up in the rotating machinery or other mechanism 15 which must be relieved. The ball 16 is sized to slide freely, i.e., without constriction but closely fitted, in the bore 12. There is also provided in the tubular body 11 a relief passage 18 above the ball 16 which permits the pressure to be discharged into the ambient pressure area containing the machinery. In addition, this port 18 permits the ambient pressure to be applied to the top of the ball 16 so that the gravitational forces holding the ball 16 in place are constant. The passage 18 is inclined from the top of the bore toward the bottom of the bore in order to prevent contamination from the particles in any air entering the chamber 12. When the pressure is applied as shown by the arrows to the ball 16, the pressure is permitted to flow to the ambient through the passage 18 as the ball is lifted off the sealing member 13.

Figure 2:
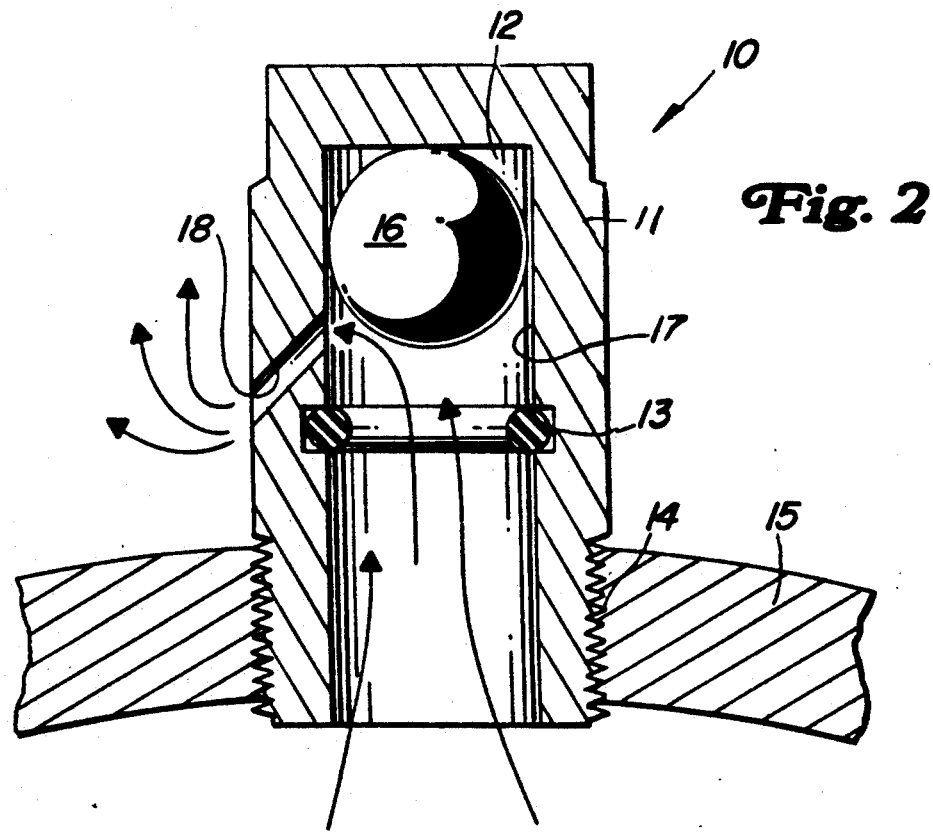
FIG. 2 is a sectional view similar to FIG. 1 depicting the relief valve when the ball is fully unseated permitting maximum relief of the gas pressures through the valve.

FIG. 2 shows the maximum displacement of the ball. It is noted that such a massive pressure build up and gas flow required to lift the ball that distance would not normally be encountered. In operation, the ball 16 would be gradually raised to permit the escape of the pressurized fluid in the form of a gas around the edges of the seal to the ambient through the passage 18. Thus, a predetermined amount of pressure determined by the weight of the ball and the resilience of the sealing means 13 will slowly be leaked past this novel pressure relief valve and the valve will immediately reseat when the pressure decreases below the predetermined value. This seating will occur because the gravitational forces exceed the pressure in the chamber of the machinery. This force will remain constant, whereas mechanical spring values will change over a time.

Variations in other aspects of the preferred embodiment will occur to those versed in the art, all without departure from the spirit and scope of the invention.

What is claimed is:

1. A pressure relief ball valve for unilaterally relieving excess pressure from a chamber to ambient comprising:
    a tubular member having a bore therein;
    a chamber under pressure;
    a first end of said bore and said tubular member being closed;
    a second end of said bore and said tubular member being open;
    a relief port opening in said tubular member between said ends extending from said bore to ambient;
    a ball inserted in said bore;
    a resilient sealing means in said bore, said sealing means located in said bore between said opening and said relief port opening;
    means connecting said open end of said tubular member to said chamber;
    said ball located in closed end of said bore above said sealing means and below said relief port opening whereby excess pressure larger than the pressure of the force of gravity on said ball in said chamber will be relieved past said ball and out said relief port.

2. A pressure relief ball valve as in claim 1 wherein said relief port extends toward said open end of said bore.

3. A pressure relief ball valve as in claim 1 wherein said relief pressure is determined by the weight of said ball.

4. A pressure relief ball valve as in claim 1 wherein said diameter of said bore is determined by the amount of material required in said ball and the relief pressure desired.

5. A pressure relief ball valve as in claim 3 wherein said resiliency of said sealing means varies with variations in weight of the ball to insure the sealing of the valve.

* * * * *